(12) United States Patent
Allen et al.

(10) Patent No.: US 6,967,185 B2
(45) Date of Patent: Nov. 22, 2005

(54) SYNTHESIS OF NOBLE METAL, SULPHIDE CATALYSTS IN A SULFIDE ION-FREE AQUEOUS ENVIRONMENT

(75) Inventors: Robert J. Allen, So. Harwich, MA (US); Andrea F. Gulla, St. Malden, MA (US)

(73) Assignee: De Nora Elettrodi S.p.A., (IT)

( * ) Notice: Subject to any disclaimer, the term of this patent is extended or adjusted under 35 U.S.C. 154(b) by 0 days.

(21) Appl. No.: 10/877,005

(22) Filed: Jun. 24, 2004

(65) Prior Publication Data

US 2005/0164877 A1    Jul. 28, 2005

Related U.S. Application Data

(60) Provisional application No. 60/539,627, filed on Jan. 28, 2004.

(51) Int. Cl.[7] .................. B01J 27/02; B01J 27/043; B01J 27/045; B01J 21/18
(52) U.S. Cl. .................. 502/216; 502/185; 502/222; 502/223; 423/561.1
(58) Field of Search ................ 502/216, 222, 502/223, 185; 423/561.1

(56) References Cited

U.S. PATENT DOCUMENTS

| | | | |
|---|---|---|---|
| 2,838,375 A * | 6/1958 | Gring et al. | 423/628 |
| 4,024,079 A * | 5/1977 | Okuyama et al. | 502/216 |
| 4,513,094 A * | 4/1985 | Luczak | 502/101 |
| 4,956,331 A * | 9/1990 | Tsurumi et al. | 502/339 |
| 6,358,381 B1 * | 3/2002 | Allen et al. | 204/283 |
| 6,855,660 B2 * | 2/2005 | Tsou et al. | 502/216 |
| 2005/0009696 A1 * | 1/2005 | Mao et al. | 502/325 |

\* cited by examiner

*Primary Examiner*—J. A. Lorengo
*Assistant Examiner*—Patricia L. Hailey
(74) *Attorney, Agent, or Firm*—Charles A. Muserlian

(57) ABSTRACT

A noble metal sulfide catalyst obtained by reaction of a precursor of at least one noble metal with a thionic species in an aqueous environment essentially free of sulfide ions useful as an electrocatalyst in the depolarized electrolysis of hydrochloric acid.

9 Claims, No Drawings

SYNTHESIS OF NOBLE METAL, SULPHIDE CATALYSTS IN A SULFIDE ION-FREE AQUEOUS ENVIRONMENT

PRIOR APPLICATION

This application is a non-provisional of U.S. provisional patent application Ser. No. 60/539,627 filed Jan. 28, 2004.

FIELD OF THE INVENTION

The invention is relative to a catalyst particularly to a noble metal sulfide electrocatalyst, and to a method for producing the same.

BACKGROUND OF THE INVENTION

Nobel metal chalcogenides are widely known in the field of electrocatalysis; in particular, electrocatalysts based on rhodium and ruthenium sulfide are currently incorporated in gas-diffusion electrode structures for use as oxygen-reducing cathodes in highly aggressive environments, such as in the depolarized electrolysis of hydrochloric acid.

Nobel metal sulfides for use in electrocatalysis are prepared by sparging hydrogen sulfide in an aqueous solution of a corresponding noble metal precursor, usually a chloride, for instance as disclosed in U.S. Pat. No. 6,149,782 which is relative to a rhodium sulfide catalyst. The synthesis of noble metal sulfide catalysts with hydrogen sulfide in aqueous solutions is conveniently carried out in the presence of a conductie carrier, in most of the cases consisting of carbon particles. In this way, the noble metal sulfide is selectively precipitated on the carbon particle surface, and the resulting product is a carbon-supported catalyst, which is particularly suitable for being incorporated in gas-diffusion electrode structures characterized by high efficiency at reduced noble metal loadings. High surface carbon blacks, such as Vulcan XC-72 from Cabot Corp./USA are particularly fit to the scope.

A different procedure for the preparation of carbon-supported noble metal sulfide catalysts consists of an incipient wetness impregnation of the carbon carrier with a noble metal precursor salt, for instance, a noble metal chloride, followed by solvent evaporation and gas-phase reaction under diluted hydrogen sulfide at ambient or elevated temperature, whereby the sulfide is formed in a stable phase. This is, for instance, disclosed in the co-pending provisional application Ser. No. 60/473,543, which is relative to a ruthenium sulfide catalyst.

In the case of rhodium, prior to its use, the noble metal sulfide catalysts so obtained are subjected to an adequate stabilizing thermal treatment, at a temperature usually between 300° and 700° C. In other cases, a temperature as low as 150° C. may be sufficient for an adequate thermal treatment.

Although these catalysts show good performances in terms of oxygen reduction activity and of stability in highly aggressive environments, that makes them virtually the only viable materials for oxygen reduction catalysts in hydrochloric acid electrolysis, their production via hydrogen sulfide route is affected by some inconveniences.

Firstly, the use of a highly hazardous species such as hydrogen sulfide, which is a flammable and noxious gas, in their synthesis poses serious environmental and human health concerns. The handling of hydrogen sulfide is a very delicate matter which can only be dealt by resorting to expensive safety measures.

Secondly, the precipitation in an environment where free sulfide ions are present can lead to the formation of compounds with variable stoichiometry, and this can hamper the reproducibility of the required catalyst, especially with certain noble metals; sulfide ions are furthermore a toxic and environmentally unfriendly species.

Other common reagents for the precipitation of sulfides, such as polysulfides, thioacetic acid or thioacetamide, are less hazardous than hydrogen sulfide, but the reaction pathway in an aqueous environment still follows a pre-ionization or hydrolization of these compounds to provide undesired free sulfide ions.

An alternative synthetic route for the production of noble metal sulfides to be used in oxygen reduction catalysts, in the absence of free sulfide ions and especially of the highly flammable and highly toxic hydrogen sulfide species is therefore a stringent requirement for a successful scale-up of noble metal sulfide catalyst production, and eventually for the commercialization of potentially large electrochemical processes such as the depolarized electrolysis of hydrochloric acid.

These and other objects and advantages of the invention will become obvious from the following detailed description.

THE INVENTION

Under one aspect, the invention is directed to a noble metal sulfide catalyst, preferably supported on high surface area carbon black, obtained by reacting a correspondent noble metal precursor, preferably a chloride, with a thionic species in an aqueous solution. By high surface area carbon black, it is intended a carbon black species with surface area exceeding 50 $m^2/g$. By thionic species, it is intended any chemical species containing a thio function, such as thiosulfates, thionic acids and acid derivatives thereof. In a preferred embodiment, the reaction is carried out in an aqueous solution essentially free of sulfide ions. The catalyst of the invention may be the sulfide of any noble metal or even a mixed sulfide of at least one noble metal and one or more co-elements. In a preferred embodiment, such noble metal is selected from the group of ruthenium, rhodium, platinum, iridium and palladium. In a most preferred embodiment, the catalyst is subjected to a thermal treatment at a temperature of 150° to 700° C. prior to its use.

The catalyst of the invention is particularly suitable for being incorporated in gas-diffusion electrode structures produced on conductive webs such as carbon cloths or metal meshes, especially gas-diffusion cathodes for oxygen-depolarized electrolysis of hydrochloric acid and other oxygen-consuming cathodes in highly aggressive environments.

Under another aspect, the invention is directed to a method for the production of a noble metal sulfide catalyst in the absence of hydrogen sulfide, and essentially in a free sulfide ion-free environment, comprising reacting a solution of a precursor of the noble metal, optionally a chloride, with an aqueous solution containing a thinic species, preferably a sodium or ammonium thiosulfate or tetrathionate solution.

The noble metal sulfide catalyst of the invention may comprise the sulfide of a single noble metal, or the mixed sulfide of a noble metal and of a further noble or non-noble metals. The precursor solution of noble metal may therefore comprise precursors of further, noble or non-noble metals. Alternatively, a mixed sulfide catalyst may be prepared by reacting the precursor solution of a noble metal and a thionic species containing a second, noble or non-noble metal. It is known that, in general, the thiosulfate anion can form sulfides by a disproportionation reaction, giving one sulfide and one sulfate ion as products.

$$S_2O_3^{-2} + H_2O \rightarrow S^{-2} + SO_4^{2-} + 2H^+$$

The inventors have nevertheless found out that, under certain conditions, the synthesis of sulfides of noble metals (e.g. rhodium, ruthenium, iridium, platinum or palladium) from thiosulfates proceeds without any detectable release of free sulfide ions. Without wishing the present invention to be bound to any particular theory, it can be assumed that the process occurs by direct reaction of the metal ion with one of the two sulfur atoms, resulting in the splitting off of the remaining portion. More precisely, in the example reported hereafter, the inventors have observed that the preferred pathway is that of partial disproportionation, also known as metathesis of the $S_2O_3^{-2}$ species, in which the two S atoms are non-equivalent according to the following stoichiometry:

$$S_2O_3^{-2} \rightarrow S^{-2} SO_3$$

The inventors observed, in particular that thiosulfates react with some transition metals at a pH between 0.1 and 4.0 to form metal sulfides when the aqueous solution containing the reagent is brought to boiling or at temperatures between 50° C. and 100° C.

When thiosulfates are used for the precipitation of sulfides, the order of addition of the reagents is critical in providing the desired sulfide catalyst. In fact, if thiosulfate were added first to an acidic solution in the absence of the metals to be precipitated, the following disproportionation reaction would occur:

$$2H^+ + S_2O_3^{-2} \rightarrow S^0 + SO_2 + H_2O.$$

Conversely, if metal ions are present in solution prior to the addition of thiosulfate, the latter appears to be stabilized, thus, retarding disproportionation and therefore allowing for a metathesis to a sulfide. The order of addition of the reagents is instead less important as concerns other types of thionic species. for instance, tetrathionate is very stable in acidic solution and does not undergo a disproportionation reaction of the kind seen above.

The precipitation of sulfides from other thionic acid derivatives such as dithionate ($S_2O_6^{-2}$), trithionate ($S_3O_6^{-2}$), tetrathionate ($S_4O_6^{-2}$), pentathionate ($S_5O_6^{-2}$) or heptathionate ($S_7O_6^{-2}$) is not mentioned in the prior art, and its pathway is not yet completely clear. However, the inventors could obtain various noble metal chalcogenides from all these species, in conditions similar to those relative to the precipitation with thiosulfates, again, with no detection of free sulfide ions in any step of the process.

The precipitation of noble metal or mixed metal sulfides with a tetrathionate species (for instance, with sodium tetrathionate) is particularly preferred, since sodium tetrathionate is a widespread and cheap commercial product. Also, in this case, the reaction with transition metals occurs in a pH range comprised between 0.1 and 4.0 (most preferably between 1.0 and 4.0), in a temperature range between 50° C. and the boiling temperature.

In a preferred embodiment, the reaction is carried out in the presence of high surface area carbon particles or other inert and preferably conductive particles to obtain a supported noble metal sulfide catalyst. In a preferred embodiment, the solution of thionic reactant is added in discrete aliquots, for instance, 2 to 10 equivalent aliquots added at time intervals ranging from 15 seconds to 10 minutes. In a preferred embodiment, after adding the solution of thionic reactant to the noble metal precursor solution, the resultant solution is heated to boiling temperature until the reaction is completed (which may take 5 minutes to two hours, depending on the selected precursor and the reaction conditions). The reaction is preferably followed by color change of the supernatant liquid, so that completion of the reaction may be simply determined.

In a most preferred embodiment, the method of the invention further comprises subjecting the product thus obtained to a thermal treatment at a temperature of 150° to 700° C. prior to its use.

The following examples have the purpose of better clarifying the invention without constituting a limitation of its scope, which is exclusively defined by the appended claims.

EXAMPLE 1

Described herein is a method to precipitate rhodium sulfide on carbon from an acidic aqueous solution free of sulfide ions. Precipitation reactions of other noble metal sulfide catalysts, such as the sulfides of ruthenium, platinum, palladium or iridium, only require minor adjustments that can be easily derived by one skilled in the art.

7.62 g of $RhCl_3.H_2O$ were dissolved in 1 liter of deionized water, and the solution was refluxed (preparation of the noble metal precursor solution). 7 g of Vulcan XC72-R high surface area carbon black from Cabot Corporation were added to the solution, and the mix was sonicated for 1 hour at 40° C. (preparation of the noble metal precursor solution further containing carbon particles).

8.64 g of $(NH_4)_2S_2O_3$ were diluted in 60 ml of deionized water, after which a pH of 7.64 was determined (preparation of the aqueous solution containing a thionic species).

The rhodium/Vulcan solution was heated to 70° C. while stirring and monitoring the pH. Once reached 70° C., the thiosulfate solution was added in four equivalent aliquots (15 ml each), one every 2 minutes. Between each addition, constancy of Ph, temperature and color of the solution were checked.

After the last aliquot of thiosulfate solution was added, the resulting solution was heated to 100° C. which temperature was held for 1 hour. The reaction was monitored by checking the color changes: the initial deep pink/orange color, which progressively changed to brown as the reaction progressed, finally turned colorless upon completion of the reaction, thus, indicating a total absorption of the products on the carbon. Spot tests were also carried out in this phase at various times with a lead acetate paper, which confirmed that no free sulfide ion was present in the reaction environment at any time. The precipitate was allowed to settle and then filtered. The filtrate was washed with 1000 ml of deionized water to remove any excess reagent. Then, a filter cake was collected and air dried at 110° C. overnight. The dried product was finally subjected to heat treatment under flowing argon for 1 hour at 650° C., resulting in a weight loss of 22.15%.

The resulting carbon supported catalyst was first characterized in a corrosion test, to check its stability in a hydrochloric acid electrolysis environment. For this purpose, part of the sample was heated to boiling in a chlorine-saturated HCl solution, at the same conditions disclosed in Example 4 of U.S. Pat. No. 6,149,782. The color of the resulting solution was the characteristic trace pink of the more stable forms of rhodium sulfide.

Actual performances in hydrochloric acid electrolysis of the catalyst prepared according to the method of the invention and incorporated in a gas-diffusion structure on a conductive web as known in the art were also checked. A catalyst/binder layer with a noble metal loading of 1 mg/cm$^2$ was obtained on an ELAT® carbon cloth-based gas diffuser produced by De North America/USA and PTFE from an aqueous suspension was used as the binder. The gas diffusion-electrode thus obtained was sintered at 340° C. under forced ventilation, and then used as an oxygen-reducing cathode in a hydrochloric acid electrolysis lab cell. A steady voltage consistently below 1.2 V at 4 kA/m$^2$ was recorded during a two week operation, which is an indication of an excellent electrochemical behavior.

EXAMPLE 2

A rhodium sulfide catalyst equivalent to the one of the previous example was prepared in a similar way, the difference being that sodium tetrathionate was used as thionic species, instead of ammonium thiosulfate. 7.62 g of $RhCl_3H_2O$ were dissolved in 1 liter of deionized water, and the solution was refluxed (preparation of the noble metal precursor solution). 7 g of Vulcan XC72-R high surface area carbon black from Caot Corporation were added to the solution, and the mix was sonicated for 1 hour at 40° C. (preparation of the noble metal precursor solution further containing carbon particles).

18.86 g of $Na_2S_4O_6*2H_2O$ were diluted in 100 ml of deionized water, after which a pH of 7.72 was determined (preparation of the aqueous solution containing a thionic species). The rhodium/Vulcan solution was heated to 70° C. while stirring and monitoring the pH. Once reached 70° C., the tetrathionate solution was added in four equivalent aliquots (25 ml each), one every 2 minutes. Between each addition, constancy of pH, temperature and color of the solution were checked.

After the last aliquot of tetrathionate solution was added, the resulting solution was heated to boiling for 1 hour. The reaction was monitored by checking the color changes: the initial yellow color, which progressively changed to brown as the reaction progressed, finally turned to colorless upon completion of the reaction, thus indicating a total absorption of the products on the carbon.

Spot tests were also carried out in this phase at various times with a lead acetate paper, which confirmed that no free sulfide ion was present in the reaction environment at any time. The precipitate was allowed to settle and then filtered. The filtrate was washed with 1,000 ml deionized water to remove any excess reagent, then a filter cake was collected and air dried at 110° C. overnight. The dried product was finally subjected to heat treatment under flowing nitrogen for 2 hours at 650° C., resulting in a weight loss of 24.65%.

The resulting carbon supported catalyst was subject to the same corrosion and electrochemical tests of the previous example, showing identical results. Equivalent rhodium sulfide catalyst were obtained also by using sodium trithionate, tetrathionate and heptathionate precursors previously prepared according to known procedures, with minor adjustments easily derivable by one skilled in the art. Analogous corrosion and electrochenmical results were obtained also in these cases.

EXAMPLE 3

A rhodium-molybdenum sulfide catalyst was prepared by means of the following procedure: In a 500 ml, 250 ml of a previously refluxed 3 g/l solution of $RhCl_3H_2O$ were added (about 0.75 g of Rh, equivalent to 0.0073 moles). 3.37 g of Vulcan XC720R high surface area carbon black from Cabot Corporation were added to the solution, and the mix was sonicated for 1 hour at 40° C. (preparation of the noble metal precursor solution containing carbon particles). 1.9 g of tetrathiomolybdate $(NH_4)MoS_4$ were diluted in 70 ml of deionized water (preparation of a solution of a thionic species containing a second metal, in this case, a non-noble metal thionate).

The rhodium-Vulcan precursor solution was heated to 70° C. while stirring and monitoring the pH. Once reached 70° C., the tetrathiomolybdate solution was added in four equivalent aliquots, one every 2 minutes. Between each addition, constancy of pH, temperature and color of the solution were checked. After the last aliquot of tetrathiomolybdate solution was added, the resulting solution was heated to boiling for 1 hour. The reaction was monitored by checking the color changes: the initial yellor color, which progressively changed to light yellow as the reaction progressed, finally turned to colorless upon completion of the reaction, thus, indicating a total absorption of the products on the carbon. Spot tests were also carried out in this phase at various times with a lead acetate paper, which confirmed that no free sulfide ion was present in the reaction environment at any time. The precipitate was allowed to settle and then filtered; the filtrate was washed with 500 ml of warm (80° C.) deionized water to remove any excess reagent. Then, a filter cake was collected and air dried at 110° C. overnight.

EXAMPLE 4

A ruthenium-rhodium sulfide catalyst was prepared by means of the follow procedure: in a 500 ml beaker, 100 ml of a previously refluxed 12 g/l solution of $RuCl_3H_2O$ (about 1.2 g of $Ru^{+3}$) and 100 ml of a previously refluxed 3 g/l solution of $RhCl_3H_2O$ (about 0.75 g of Rh) were added, with a consequent weight ratio of about 80% Ru and 20% Rh. The solution was brought to 350 ml with deionized water and 3.5 g of Vulcan XC72—R high surface area carbon black from Cabot Corporation were added. The mix was sonicated for 1 hour at 40° C. (preparation of the precursor solution of two distinct noble metals further containing carbon particles).

4.35 g of $(NH_4)_2S_2O_3$ were diluted in 20 ml of deionized water, after which a pH of 7.64 was determined (preparation of the aqueous solution containing a thionic species). The rhodium-ruthenium/Vulcan solution was heated to 70° C. while stirring and monitoring the pH. Once reached 70° C., the thiosulfate solution was added in four equivalent aliquots (5 ml each), one every 2 minutes. Between each addition, constancy of pH, temperature and color of the solution were checked. After the last aliquot of thiosulfate solution was added, the resulting solution was heated to 100° C. and temperature was held for 1 hour. The reaction was monitored by checking the color changes: the initial deep pink/orange color, which progressively changed to brown as the reaction progressed, finally turned to colorless upon completion of the reaction, thus indicating a total absorption of the products on the carbon. Spot tests were also carried out in this phase at various times with a lead acetate paper which confirmed that no free sulfide ion was present in the reaction environment at any time. The precipitate was allowed to settle and then filtered. The filtrate was washed with 700 ml of warm deionized water to remove any excess reagent, then a filter cake was collected and air dried at 110° C. overnight.

Various modifications of the products and processes of the invention may be made without departing from the spirit or scope thereof and it is to be understood that the invention is intended to be limited only as defined in the appended claims.

What we claim is:

1. A method for producing a noble metal sulfide catalyst comprising reacting a solution of a precursor of the at least one noble metal, optionally a chloride, with an aqueous solution containing a thionic species in an essentially sulfide-free environment.

2. The method of claim 1 wherein the pH of said solution of a precursor of at least one noble metal and said aqueous solution containing a thionic species is between 0.1 and 4.

3. The method of claim 2 wherein said solution of a precursor of at least one noble metal further contains carbon particles, optionally a carbon black with a surface area exceeding 50 $m^2/g$.

4. The method of claim 1 wherein said thionic species is selected from the group of thiosulfates, dithionates, trithionates, tetrathionates, pentathionates, heptathionates and noble or non-noble metal thionates, optionally as sodium or ammonium salts.

5. The method of claim 1 wherein said aqueous solution containing a thionic species is added to said solution of a precursor of a noble metal in descrete aliquots, optionally 2 to 10 equivalent aliquots at a time interval of 15 seconds to ten minutes.

6. The method of claim 5 wherein said completion of the reaction is determined by detection of a color change.

7. The method of claim 5 further comprising isolating the resulting noble metal sulfide catalyst and subjecting the same to a thermal treatment at a temperature between 150° and 700° C.

8. The method of claim 1 wherein said aqueous solution containing a thionic species is added to said solution of a precursor of a noble metal and the resulting solution is brought to boiling temperature for 5 to 120 minutes until completion of the reaction.

9. The method of claim 1 wherein said at least one noble metal is selected from the group consisting of ruthenium, rhodium, platinum, iridium and palladium.

* * * * *